C. V. BOYS.
MOTOR VEHICLE WHEEL.
APPLICATION FILED DEC. 23, 1916.
1,326,437. Patented Dec. 30, 1919.
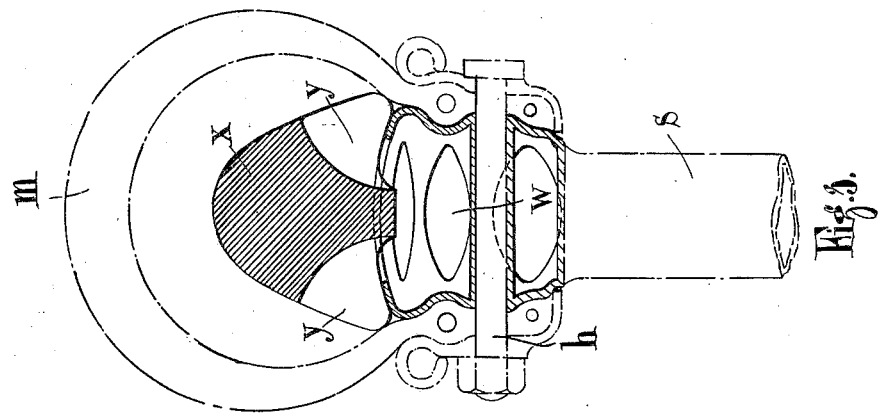
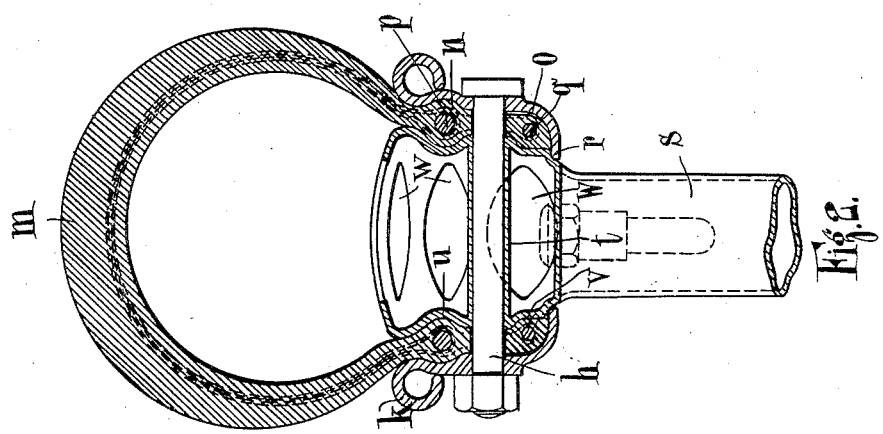
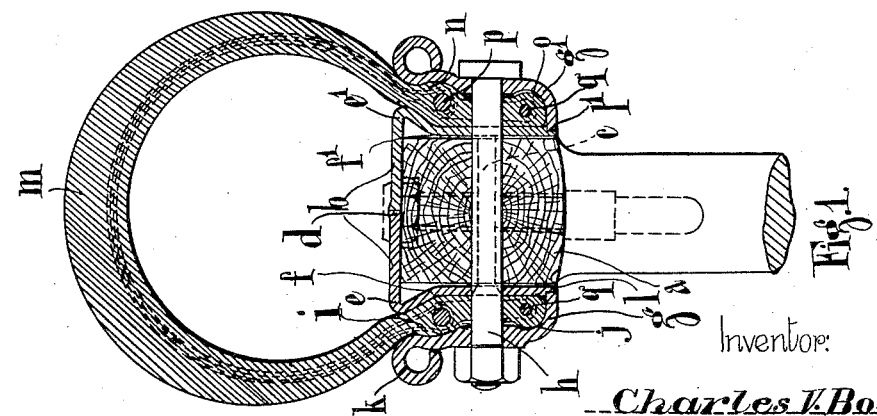
Inventor:
Charles V. Boys

UNITED STATES PATENT OFFICE.

CHARLES VERNON BOYS, OF WESTMINSTER, LONDON, ENGLAND.

MOTOR-VEHICLE WHEEL.

1,326,437.  Specification of Letters Patent.  Patented Dec. 30, 1919.

Application filed December 23, 1916. Serial No. 138,664.

*To all whom it may concern:*

Be it known that I, CHARLES VERNON BOYS, F. R. S., a subject of the King of Great Britain and Ireland, and residing at 66 Victoria street, Westminster, London, S. W., England, have invented certain new and useful Improvements in and Relating to Motor-Vehicle Wheels, of which the following is a specification.

This invention relates to tubeless pneumatic tires of the type formed by a band of material detachably gripped with the inner surface of its edges in air-tight contact with the opposite sides of the felly of a wheel.

The material of such tires, when in use inflated, is subjected to tension resulting in a thinning of the material, and this thinning in some forms which have been proposed would permit leakage past the portions where the sealing of the joint should be effected. In other forms porous material, such as wood, has formed a part of the surface subjected to air pressure so that the device could not be satisfactorily used as a tubeless tire.

The object of the present invention is to render the joints of the band with the felly firmer and more air-tight and to provide other improvements.

The invention consists in a pneumatic tire formed by a band of material detachably gripped with the inner surfaces of its edges in air-tight contact with the opposite sides of the felly of a wheel, in which the sides of the felly and the gripping means are provided with clamping surfaces shaped to receive ribs or beads molded upon the edges of the band and to form an air-tight joint by wedge action to hold the inflation pressure.

The invention further consists in a pneumatic tire of the type indicated in which the gripping means comprise a pair of rim flanges corresponding with and positioned upon opposite sides of the felly, said flanges having inturned edges around their inner peripheries which cover the extreme edges of the tire band and abut against the sides of the felly, to increase the grip of the outer peripheries of the rim flanges and felly upon the band at the sealing contact surfaces, and to protect the edges of the tire from damage or wet.

The invention further consists in a pneumatic tire of the type described in either of the preceding paragraphs in combination with a metal wheel having hollow spokes through which the air may circulate for the purpose hereinafter described.

The invention also consists in the improvements in pneumatic tires as hereinafter described.

Referring to the accompanying drawings which show by way of example some forms in which the invention may be carried into effect:—

Figure 1 shows the invention applied to an ordinary or solid type of wheel;

Fig. 2 shows the improved tire in combination with a wheel having a hollow felly and spokes;

Fig. 3 shows a buffer tire which may be fitted in conjunction with either of the above or similar tires.

In carrying the invention into effect in a convenient form shown, by way of example, in Fig. 1, *a* represents the cross-section of a felly of a wooden wheel constructed in any convenient manner. Upon and partially inclosing the felly *a* is a metal tire or casing *b* which may be formed of two symmetrical halves fastened to the wheel felly by rivets *c* shown dotted or the like passing therethrough, the halves being welded at *d* when in position in order that the peripheral surface of the felly may be rendered air-tight.

The casing *b* is provided with projections *e*, *e'* which form circumferential recesses or grooves *f f'* for the purpose hereinafter described.

Upon each side of the felly of the wheel is a rim flange *g* or *g'* provided with holes for the reception of bolts *h* which pass through the rim flanges and felly and retain the former in connection with the latter. The rim flanges *g*, *g'* are formed with circumferential recesses or grooves *i* and *j* and their outer peripheries may be outwardly turned or completely beaded over, as shown at *k*. The inner peripheries of the rim flanges are inturned from the groove *j* in such a manner that they will lodge against the sides of the felly or casing *b* or in recesses *l*, *l'*, formed therein.

The tire *m* is made horseshoe shape in section and is lined with a layer of good, air-tight rubber which, in conjunction with the air-tight metal periphery of the felly, serves the purpose of an inner tube. The tire is composed of the usual companion members of rubber and fabric, the edges being ribbed circumferentially at $n$ and $o$ to correspond with the grooves in the rim flanges and felly. By means of this construction the tension to which the material is subjected, when in use inflated, tends to pull the thicker ribbed portion $n$ as a wedge between the clamping surfaces, so that the inevitable thinning due to the tension is compensated for and does not produce leakage past the sealing surfaces. If the edges of the tire are continued within the circle of bolts, corresponding holes are provided in the tire.

In order that the edges of the tire may be very securely held, it is preferable to make the fabric or like insertion material conform to the ribs of the tire and grooves of the rim flanges and felly. For this purpose rings $p$, $q$, of wire, hard rubber or other material harder than that of the tire may be inserted in the center of the thickness of the edges of the tire, the fabric insertion being carried around upon both sides of such rings and thus, when vulcanized together with the rubber into a solid structure, insuring a firm and air-tight engagement of the ribs with the grooves. Soft soap or other suitable lubricant may, if desired, be used upon the adjacent surfaces of the rim flanges, tire and felly in order to increase the tightness of the joint.

In the construction illustrated by way of example in Fig. 2, a steel or like metallic shell wheel is employed in place of a wooden construction, the felly $r$ being connected to the nave portion by tubular spokes $s$. When employing a shell wheel for the purpose of this invention, any bolt holes in the faces of the shell are rendered air-tight preferably by the use of sleeves $t$ passing through the interior of the wheel from one face to the other and being welded at each end to the faces. If conical or other methods of rendering the wheel detachable are provided, the interior of the shell is hermetically closed to the outer air while the wheel is still detached.

The sides of the hollow felly are provided with one or more circumferential grooves, $u$, $v$, as described in connection with the form hereinbefore mentioned, and the outer edges of the sides may then for light wheels terminate, so that the section of the felly by a plane passing through the axis of the wheel is U-shaped or like a trough. Where, however, greater strength is required, the edges are continued and are bent over inward to meet one another, being preferably welded together. If such welding is adopted the edges are formed so as to provide a number of large holes $w$ in the outer periphery of the wheel.

The air valve for wheels constructed in accordance with this invention may, in the case of a construction such as illustrated in Fig. 1, be firmly attached to the outer periphery of the casing $b$ and pass through the wooden rim to a position in which easy access may be obtained thereto. In the case of a shell wheel the valve may be positioned upon the inner surface of the felly or in any other convenient position on the shell.

The tires constructed as hereinbefore described may be used in combination with a buffer tire, as shown in Fig. 3, in order to provide for the soft running of the vehicle for a moderate distance even though the pneumatic tire be deflated. Such buffer tire $x$ may be formed of a solid structure of rubber or other suitable material supported centrally by the felly. In the case of a shell wheel such as illustrated in Fig. 2, the buffer tire $x$ may be provided with pockets or cavities $y$ for allowing free circulation of the air between the interior of the tire and the interior of the shell wheel, and the material between the pockets may be formed to project into the holes $w$ to prevent creeping of the buffer tire on the rim. If there are no holes in the rim, projections may be formed thereon to engage the buffer tire and prevent creeping.

It will be seen that a motor wheel according to this invention has the advantage that the tire may be attached or detached without difficulty or risk of straining by too violent use of tire levers, and that it cannot come off on the road even if suddenly deflated; that the cost and weight of an inner tube are avoided, and that in the event of a hollow wheel structure being employed, any warm air within the tire will be displaced by heavier cooler air within the wheel under the action of centrifugal force when the wheel is rotating, the cooling action of the spokes being thus made use of for preventing the tire from becoming unduly heated.

It is an advantage of this type of tire that it can be repaired from the inside and can also be reinforced simply when required by a suitable bandage.

It will also be seen that modifications in the construction and manner of carrying the invention into effect may be employed without in any way departing from the spirit of the same.

Having now described my invention what I claim as new and desire to secure by Letters Patent is:—

1. In combination with a wheel rim, a band forming with said rim an air chamber, said band having the inner surfaces of its edge portions bearing upon the opposite sides of the rim, gripping means to hold the said edge portions against the rim sides, said rim sides and the opposing faces of the gripping means being substantially convergent relative to each other toward the outer periphery of the rim, the edge portions of the band having ribs substantially conforming in shape to the outwardly tapered annular space between the gripping means and the rim sides, and forming a joint with the rim to hold the initial air pressure, the tightness of which increases with the increase of air pressure within the band, substantially as described.

2. A pneumatic tire as claimed in claim 1, in which the gripping means comprise a pair of flanges corresponding with and positioned upon opposite sides of the rim, said flanges having inturned edges around their inner peripheries which cover the extreme edges of the tire band and abut against the sides of the rim, substantially as described.

3. In combination in a vehicle wheel, a rim, a pneumatic tire forming with said rim an air chamber, and means for gripping the edge portions of the tire against the sides of the rim, said edge portions being enlarged to form ribs or beads, the sides of the rim and the inner faces of the gripping means having complementary sloping sided depressions to receive the ribs, substantially as described.

4. In combination in a vehicle wheel, an air chamber inclosed in part by the wheel rim and in part by a rubber band, at least one sloping sided circumferential corrugation upon each of the side faces of said rim, portions of said rubber tire band overlapping the two side faces of said rim and forming an air-tight joint thereon, a rim flange covering each of the overlapping portions of the tire, sloping sided corrugations in said rim flanges opposite to the corrugations in said rim, gradually thickened beads adjacent said tire edges occupying the spaces formed by said opposed corrugations and means for gripping said tire portions between the rim flanges and the sides of the rim to form air-tight joints.

5. In combination in a vehicle wheel, an air chamber inclosed in part by the wheel rim and in part by a rubber band, at least one sloping sided circumferential corrugation upon each of the side faces of said rim, portions of said rubber tire band overlapping the two side faces of said rim and forming an air-tight joint thereon, a rim flange covering each of the overlapping portions of the tire, sloping sided corrugations in said rim flanges opposite to the corrugations in said rim, gradually thickened beads adjacent said tire edges occupying the space formed by said opposed corrugations, inwardly-turned edges on the inner peripheries of said rim flanges inclosing the extreme inner edges of said tire band and abutting against said rim to relieve the inner portions of said band from pressure, and bolts passing through holes in said rim and rim flanges within the circumscribing boundary of said corrugations for gripping the tire and forming air-tight joints at its first contact with the rim.

In testimony whereof I have signed my name to this specification.

CHARLES VERNON BOYS.